(12) United States Patent
Dottel

(10) Patent No.: US 10,817,992 B2
(45) Date of Patent: *Oct. 27, 2020

(54) SYSTEMS AND METHODS TO CREATE A DYNAMIC BLUR EFFECT IN VISUAL CONTENT

(71) Applicant: GoPro, Inc., San Mateo, CA (US)

(72) Inventor: Valerian Dottel, Allevard (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,343

(22) Filed: May 30, 2019

(65) Prior Publication Data

US 2019/0279341 A1 Sep. 12, 2019

Related U.S. Application Data

(63) Continuation of application No. 15/482,459, filed on Apr. 7, 2017, now Pat. No. 10,360,663.

(51) Int. Cl.
| | | |
|---|---|---|
| G06K 9/40 | (2006.01) | |
| G06T 5/00 | (2006.01) | |
| G06T 11/00 | (2006.01) | |

(52) U.S. Cl.
CPC .............. *G06T 5/002* (2013.01); *G06T 11/00* (2013.01); *G06T 2207/20012* (2013.01); *G06T 2207/20092* (2013.01); *G06T 2207/20182* (2013.01)

(58) Field of Classification Search
None
See application file for complete search history.

(56) References Cited

U.S. PATENT DOCUMENTS

| | | |
|---|---|---|
| 6,633,685 B1 | 10/2003 | Kusama |
| 7,512,886 B1 | 3/2009 | Herberger |
| 7,885,426 B2 | 2/2011 | Golovchinsky |
| 7,970,240 B1 | 6/2011 | Chao |
| 8,180,161 B2 | 5/2012 | Haseyama |
| 8,606,073 B2 | 12/2013 | Woodman |
| 8,774,560 B2 | 7/2014 | Sugaya |
| 8,971,623 B2 | 3/2015 | Gatt |
| 8,990,328 B1 | 3/2015 | Grigsby |
| 9,041,727 B2 | 5/2015 | Ubillos |
| 9,142,257 B2 | 9/2015 | Woodman |
| 9,342,376 B2 | 5/2016 | Jain |

(Continued)

FOREIGN PATENT DOCUMENTS

| | | |
|---|---|---|
| JP | H09181966 A | 7/1997 |
| JP | 2005252459 A | 9/2005 |

(Continued)

OTHER PUBLICATIONS

Traffic-Aware Networking for video streaming service using SDN, Calvin Hue et al., IEEE, 978-1-4673-8590, 2015, pp. 1-5 (Year: 2015).*

(Continued)

*Primary Examiner* — Jayesh A Patel
(74) *Attorney, Agent, or Firm* — Esplin & Associates, PC

(57) ABSTRACT

Systems and method to increase blurriness of visual content may be based on user control, field-of-view, and/or changes in field-of-view. By adding or increasing blurriness at the periphery of the field-of-view, more attention may be drawn to unblurred sections.

20 Claims, 5 Drawing Sheets

(56) References Cited

U.S. PATENT DOCUMENTS

| | | |
|---|---|---|
| 9,418,283 B1 | 8/2016 | Natarajan |
| 10,360,663 B1* | 7/2019 | Dottel .................. G06T 11/00 |
| 2002/0113805 A1* | 8/2002 | Li .......................... G06T 15/20 |
| | | 345/649 |
| 2002/0165721 A1 | 11/2002 | Chang |
| 2004/0001706 A1 | 1/2004 | Jung |
| 2005/0025454 A1 | 2/2005 | Nakamura |
| 2005/0033153 A1* | 2/2005 | Moriguchi ........... G01R 33/565 |
| | | 600/410 |
| 2005/0108031 A1 | 5/2005 | Grosvenor |
| 2005/0198018 A1 | 9/2005 | Shibata |
| 2006/0080286 A1 | 4/2006 | Svendsen |
| 2006/0115108 A1 | 6/2006 | Rodriguez |
| 2008/0123976 A1 | 5/2008 | Coombs |
| 2008/0183843 A1 | 7/2008 | Gavin |
| 2009/0019995 A1 | 1/2009 | Miyajima |
| 2009/0027499 A1 | 1/2009 | Nicholl |
| 2009/0125559 A1 | 5/2009 | Yoshino |
| 2009/0252474 A1 | 10/2009 | Nashida |
| 2010/0046842 A1 | 2/2010 | Conwell |
| 2010/0086216 A1 | 4/2010 | Lee |
| 2010/0161720 A1 | 6/2010 | Colligan |
| 2010/0199182 A1 | 8/2010 | Lanza |
| 2010/0274714 A1 | 10/2010 | Sims |
| 2010/0318660 A1 | 12/2010 | Balsubramanian |
| 2011/0103700 A1 | 5/2011 | Haseyama |
| 2011/0137156 A1* | 6/2011 | Razzaque .......... A61B 18/1477 |
| | | 600/424 |
| 2011/0170086 A1 | 7/2011 | Oouchida |
| 2011/0206351 A1 | 8/2011 | Givoly |
| 2011/0242098 A1* | 10/2011 | Tamaru .................. G06T 19/20 |
| | | 345/419 |
| 2012/0014673 A1 | 1/2012 | O'Dwyer |
| 2012/0027381 A1 | 2/2012 | Kataoka |
| 2012/0030263 A1 | 2/2012 | John |
| 2012/0141019 A1 | 6/2012 | Zhang |
| 2012/0210205 A1 | 8/2012 | Sherwood |
| 2012/0210228 A1 | 8/2012 | Wang |
| 2012/0246114 A1 | 9/2012 | Edmiston |
| 2012/0283574 A1 | 11/2012 | Park |
| 2013/0021464 A1* | 1/2013 | Zhang ................ G01B 11/2513 |
| | | 348/87 |
| 2013/0182166 A1 | 7/2013 | Shimokawa |
| 2013/0235071 A1 | 9/2013 | Ubillos |
| 2013/0239051 A1 | 9/2013 | Albouze |
| 2013/0300634 A1* | 11/2013 | White .................... G02B 27/017 |
| | | 345/7 |
| 2013/0330019 A1 | 12/2013 | Kim |
| 2014/0149865 A1 | 5/2014 | Tanaka |
| 2014/0152762 A1 | 6/2014 | Ukil |
| 2014/0282661 A1 | 9/2014 | Martin |
| 2015/0039646 A1 | 2/2015 | Sharifi |
| 2015/0071547 A1 | 3/2015 | Keating |
| 2015/0113009 A1 | 4/2015 | Zhou |
| 2015/0156247 A1 | 6/2015 | Hensel |
| 2015/0227772 A1* | 8/2015 | Landgrebe ............ G06K 7/1443 |
| | | 235/462.08 |
| 2015/0287435 A1 | 10/2015 | Land |
| 2015/0294687 A1* | 10/2015 | Buick .................. G11B 27/036 |
| | | 386/280 |
| 2016/0029105 A1 | 1/2016 | Newman |
| 2016/0094601 A1 | 3/2016 | Besehanic |
| 2016/0103830 A1 | 4/2016 | Cheong |
| 2016/0189752 A1 | 6/2016 | Galant |
| 2016/0260000 A1 | 9/2016 | Yamakawa |
| 2016/0286235 A1 | 9/2016 | Yamamoto |
| 2017/0229153 A1* | 8/2017 | Moore ............. H04N 21/41407 |

FOREIGN PATENT DOCUMENTS

| | | | |
|---|---|---|---|
| JP | 2006053694 A | 2/2006 | |
| JP | 2008059121 A | 3/2008 | |
| JP | 2009053748 A | 3/2009 | |
| JP | 2011188004 A | 9/2011 | |
| WO | 2006001361 A1 | 1/2006 | |
| WO | 2009040538 A1 | 4/2009 | |
| WO | 2012057623 A1 | 5/2012 | |
| WO | WO-2012057623 A1 * | 5/2012 | ........... H04N 5/2226 |
| WO | 2012086120 A1 | 6/2012 | |

OTHER PUBLICATIONS

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

Han et al., Deep Compression: Compressing Deep Neural Networks with Pruning, Trained Quantization and Huffman Coding, International Conference on Learning Representations 2016, 14 pgs.

He et al., 'Deep Residual Learning for Image Recognition,' arXiv:1512.03385, 2015,12 pgs.

Iandola et al., 'SqueezeNet: AlexNet-level accuracy with 50x fewer parameters and <0.5MB model size', arXiv:1602.07360v3 [cs.CV] Apr. 6, 2016 (9 pgs.).

Ioffe et al., 'Batch Normalization: Accelerating Deep Network Training by Reducing Internal Covariate Shift,' arXiv:1502.03167, 2015, 11 pgs.

Japanese Office Action for JP Application No. 2013-140131, dated Aug. 5, 2014, 6 pages.

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

Office Action for U.S. Appl. No. 13/831,124, dated Mar. 19, 2015, 14 pages.

Parkhi et al., 'Deep Face Recognition,' Proceedings of the British Machine Vision, 2015,12 pgs.

PCT International Preliminary Report on Patentability for PCT/US2015/023680, dated Oct. 4, 2016, 10 pages.

PCT International Search Report and Written Opinion for PCT/US15/12086 dated Mar. 17, 2016, 7 pages.

PCT International Search Report and Written Opinion for PCT/US16/31076, dated Aug. 8, 2016, 19 Pages.

PCT International Search Report for PCT/US15/23680 dated Aug. 3, 2015, 4 pages.

PCT International Search Report for PCT/US15/41624 dated Nov. 4, 2015, 5 pages.

PCT International Written Opinion for PCT/US2015/041624, dated Dec. 17, 2015, 7 Pages.

PSonar URL: http://www.psonar.com/about retrieved on Aug. 24, 2016, 3 pages.

Schroff et al., 'FaceNet: A Unified Embedding for Face Recognition and Clustering,' IEEE Conference on Computer Vision and Pattern Recognition (CVPR), 2016, 10 pgs.

Tran et al., 'Learning Spatiotemporal Features with 3D Convolutional Networks', arXiv:1412.0767 [cs.CV] Dec. 2, 2014 (9 pgs).

Yang et al., 'Unsupervised Extraction of Video Highlights via Robust Recurrent Auto-encoders' arXiv:1510.01442v1 [cs.CV] Oct. 6, 2015 (9 pgs).

* cited by examiner

SYSTEMS AND METHODS TO CREATE A DYNAMIC BLUR EFFECT IN VISUAL CONTENT

FIELD

This disclosure relates to systems and methods for increasing blurriness of visual content, and, in particular, blurring the periphery of the field-of-view to draw attention to a central area of visual content.

BACKGROUND

Sharing media content, including videos, between different users in a network and/or other platform is at the root of social media. In some cases, image sensors may capture a wider angle than is easily, typically, or preferably presented on the display of a computing platform. For example, wide angle lenses may depict a distorted view of captured images.

SUMMARY

This disclosure relates to systems and methods for increasing blurriness of visual content. In particular, for video content, increased blurriness at the periphery of the field-of-view may draw attention to unblurred content. In some implementations, visual content may include videos. In some implementations, visual content may include one or more of video content, animated content, photos, slideshows, digital graphics, and/or any combinations thereof. As used herein, the term "content" may refer to both self-contained electronic files, streaming information, and/or other types of content, as well as combinations thereof. For example, the term video content may include electronic video files, video streaming, etc.

A system that increases blurriness may include one or more physical processors, and/or other components. The one or more physical processors may be configured by machine-readable instructions. As used herein, the term "processor" is used interchangeably with the term "physical processor." Executing the machine-readable instructions may cause the one or more physical processors to facilitate increasing blurriness of visual content. The machine-readable instructions may include one or more computer program components. The computer program components may include one or more of a content component, a field-of-view component, a zoom component, a presentation component, a blur component, a display component, a user interface component, a capture component, a transfer component, and/or other computer program components.

The content component may be configured to obtain information, including but not limited to visual information. As used herein, the term "obtain" (and derivatives thereof) may include active and/or passive retrieval, determination, derivation, transfer, upload, download, submission, and/or exchange of information, and/or any combination thereof. In some implementations, visual information may represent visual content. In some implementations, visual content may have been captured by one or more image sensors. In some implementations, the obtained information may include visual content that has been captured by one or more image sensors. Captured visual content may have a particular field-of-view. Field-of-view may be defined horizontally, vertically, diagonally, and/or in combinations thereof. Unless the context dictates otherwise, field-of-view may refer by default to horizontal field-of-view.

In some cases, the particular field-of-view may change throughout capture of the visual content. For example, a video may be captured for a range of time. During the first part of the video, the capture field-of-view may be large, e.g. 180 degrees. During a subsequent second part of the video, the capture field-of-view may be smaller due to zooming in, e.g. 45 degrees. During a subsequent third part of the video, the capture field-of-view may be increased to 90 degrees, for example, due to zooming out partially. The captured video may be played back using the same field-of-view as was used during capture. In some implementations, the video may be played back using one or more different fields-of-view. For example, during playback, a user may decide to zoom in, zoom out, and/or pan around. In particular, if the captured video has large field-of-view, a user may modify the field-of-view during playback. As used herein, a user that uses the system during playback may be referred to as a viewer. As used herein, a horizontal field-of-view of 180 degrees or greater may be referred to as a "large horizontal field-of-view". As used herein, a vertical field-of-view of 135 degrees or greater may be referred to as a "large vertical field-of-view". As used herein, video content having both large horizontal field-of-view and large vertical field-of-view may be referred to as spherical video content. In some implementations, spherical video may have a horizontal field-of-view of 360 degrees. In some implementations, spherical video may have a vertical field-of-view of at least 180 degrees. In some implementations, spherical video may have both horizontal field-of-view of 360 degrees and vertical field-of-view of at least 180 degrees.

The field-of-view component may be configured to determine a field-of-view within visual content. The field-of-view used during playback may be referred to as the display field-of-view. The field-of-view used during capture may be referred to as the capture field-of-view. For example, the field-of-view within particular visual content may range from a maximum field-of-view to a minimum field-of-view. In some implementations, a maximum field-of-view may be characterized by and/or dependent on the particular image sensor or images sensors used to capture the particular visual content. For example, some cameras/lenses may be characterized by a 120-degree horizontal field-of-view and a 90-degree vertical field-of-view for capture. In some implementations, a minimum field-of-view may be characterized by and/or dependent on the particular image sensor or images sensors used to capture the particular visual content. For example, the minimum field-of-view may further be based on the capture resolution. With a sufficiently high capture resolution, the field-of-view during playback may be reduced by zooming in, preferably while maintaining acceptable image quality.

The field-of-view component may be configured to determine a particular display field-of-view for presentation of visual content on a display. The determined display field-of-view may range between the maximum field-of-view during capture and the minimum field-of-view during capture. In some implementations, a default display field-of-view may simply match the capture field-of-view. However, during playback, the field-of-view may be modified. For example, during a particular presentation of a video, a user may instruct the presentation to zoom in. As used herein, zooming in corresponds to a decrease in field-of-view. For example, during a particular presentation of a video, a program, a command, or an instruction may cause the presentation to zoom out. As used herein, zooming out corresponds to an increase in field-of-view. For example, during a particular presentation of a video, the system may effectuate the field-of-view to move, e.g. laterally. As used herein, moving the field-of-view may be referred to as "panning". In some implementations, the display field-of-view may be used so a display acts as a viewfinder into particular visual content, in particular wide-angled visual content. By way of non-limiting example, the display of a computing platform may be used as a viewfinder for spherical video content.

The zoom component may be configured to receive input that defines a modification of a field-of-view. In some implementations, the zoom component may be configured to determine a modification of a field of view. For example, a modification may define a transition from a first field-of-view to a second field-of-view. In some implementations, a modification may occur at a specified moment during playback, or during a specified period of playback. For example, during a first period of playback, visual content may be presented using a first display field-of-view. Subsequent to the first period, the display field-of-view may be modified to a second display field-of-view. During a second period of playback subsequent to the first period, visual content may be presented using the second display field-of-view. Playback is not limited to any particular number of periods or different fields-of-view. For example, in some implementations, viewers may freely zoom in, zoom out, and/or pan around throughout payback of the visual content.

The presentation component may be configured to determine presentation information based on visual content and/or obtained visual information. The presentation information may be used to effectuate presentation on a display. Presentation on the display may be referred to as playback. In some implementations, presentation information may be video content. Presentation information may have a particular field-of-view at a particular moment. For example, the field-of-view during presentation and/or playback may be determined by the field-of-view component, the zoom component, and/or other components of the system. In some implementations, presentation information may include frames of visual information. In some implementations, individual frames may be ordered in a particular order. Multiple frames may be ordered chronologically. For example, a frame of visual information may represent visual content at a particular moment. In some implementations, a frame may include an array of pixels. Presentation information may be modified, for example by the blur component, prior to presentation.

The blur component may be configured to modify presentation information prior to presentation on the display. Modification may include an increase of blurriness. In some implementations, blurriness may be defined by one or more levels of a visual characteristic of an image or other visual content. For example, visual characteristics of visual content may include, by way of non-limiting example, contrast, acutance, luminance, color, focus, sharpness, saturation, brightness, hue, defocus, and/or other characteristics. Modifications may be limited to a certain section (such as the periphery of a particular field-of-view) and/or a certain period during playback. Modifications may be made responsive to certain events during playback. For example, a modification may be made responsive to a change in field-of-view. Blurriness may be increased through any number of a variety of image-processing techniques. For example, an image may be blurred by superimposition of a copy of itself. In some implementations, blurring may be implemented by one or more pixel-based processing and/or pixel-based transformations. For example, individual pixels may be blended and/or otherwise combined with nearby pixels. In some implementations, blurriness may have a direction. By way of non-limiting example, directional blur may approximate and/or mimic motion blur. By way of non-limiting example, blurriness may approximate and/or mimic optical aberration. By way of non-limiting example, blurriness may approximate and/or mimic defocus. In some implementations, pixels at the center of an image or frame may be processed and/or transformed differently than pixels at the periphery of the image or frame. For example, an amount of blurriness may depend on the distance of an individual pixel to, say, the center of the field-of-view.

The display component may be configured to effectuate presentation on a display. For example, the display may be part of a computing platform. The presentation may depict visual content. In some implementations, the display component may be configured to present presentation information, e.g. from the presentation component and/or the blur component.

The user interface component may be configured to facilitate interaction between a user and the system. The user interface may be configured to receive user input from the user. In some implementations, user input may be received through a touchscreen and/or other user interface device. User input may confirm, enter, and/or select options, commands, instructions, and/or other information from the user.

The capture component may be configured to capture presentations presented on the display. For example, a captured presentation may be video content. In some implementations, the capture component may be configured to store a captured presentation, e.g. on electronic storage. In some implementations, the capture component may be configured to facilitate access to electronic storage. The capture component may be configured to store information in electronic storage, including but not limited to digital and/or electronic information.

The transfer component may be configured to facilitate transmission of information to and from the computing platform. For example, the transfer component may be configured to transfer visual information from a server to the content component. For example, the transfer component may be configured to transfer a captured presentation to electronic storage and/or a storage server. In some implementations, the transfer component may control and/or include a transceiver. For example, the transfer component may include a wireless transceiver configured to facilitate transmission of information between the computing platform and one or more networks. By way of non-limiting example, the networks may include a cellular network, a Wi-Fi network, and/or other networks. In some implementations, a transceiver may include one or more antennae.

As used herein, any association (or relation, or reflection, or indication, or definition, or correspondency) involving information, visual content, fields-of-view, frames, periods of playback, modifications, characteristics of visual information, presentations, parameters, thresholds, functions, vectors, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
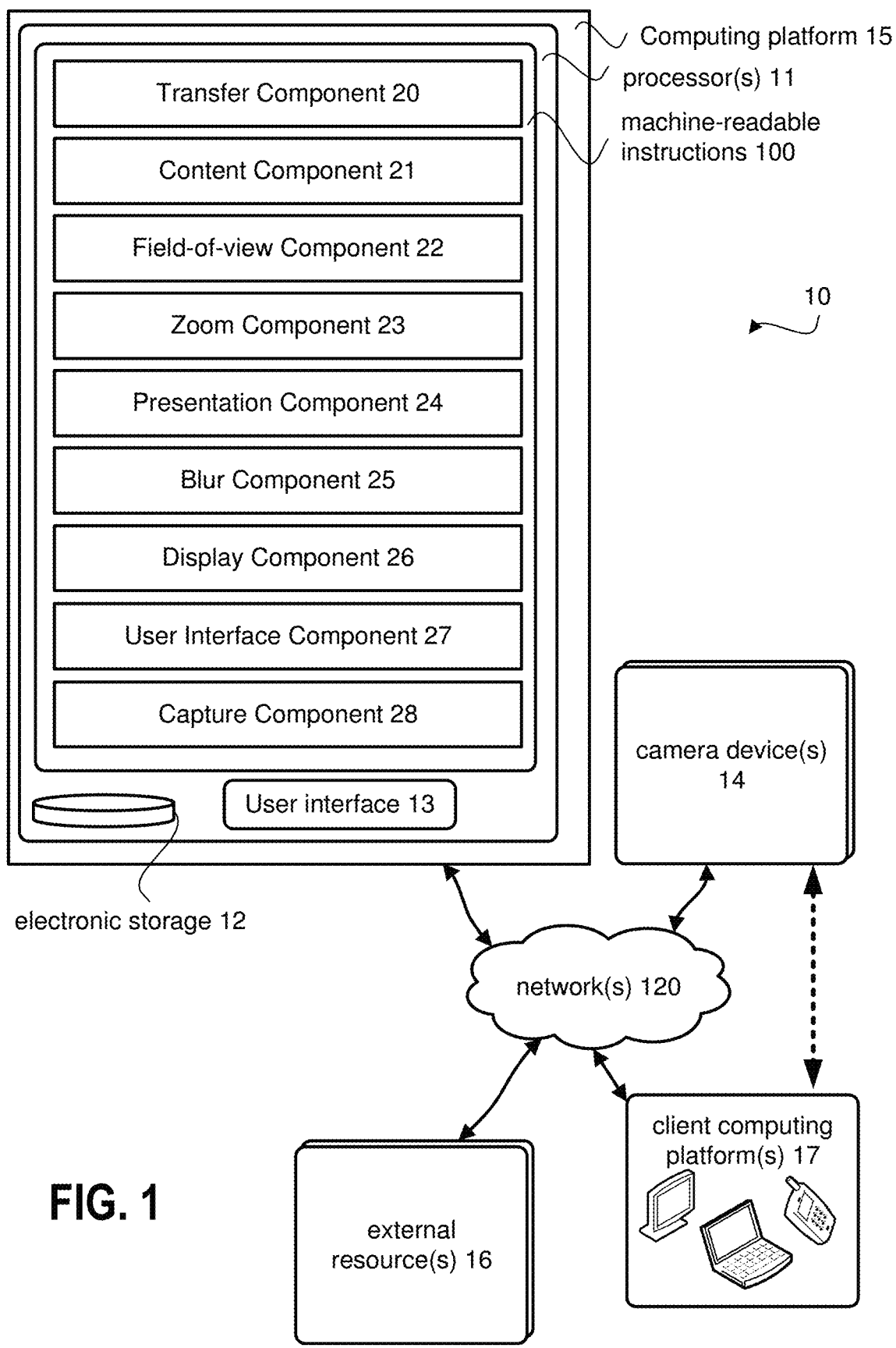
FIG. 1 illustrates a system configured to increase blurriness of visual content, in accordance with one or more implementations.

FIG. 1 illustrates a system 10 configured to increase blurriness of visual content. System 10 may include one or more of a computing platform 15, one or more client computing platforms 17, one or more processors 11, electronic storage 12, a user interface 13, one or more camera devices 14, one or more external resources 16, one or more networks 120, and/or other components. In some implementations, system 10 may include fewer components. Electronic storage 12 may include electronic storage media configured to electronically store information. Electronic storage 12 may store software algorithms, information determined by processor 11, information received remotely, and/or other information that enables system 10 to function properly. For example, electronic storage 12 may store information related to one or more of images, videos, visual content, templates, image exemplars, blurring algorithms, and/or other information. In some implementations, computing platform 15 may include a display. In some implementations, the display of computing platform 15 may be included in user interface 13 and/or operate in conjunction with user interface 13. For example, the display may be a touchscreen.

In some implementations, visual content may be defined by one or more of real-world visual information, electronic information, playback information, and/or other information. Real-world visual information may comprise information related to light and/or electromagnetic radiation incident on one or more image sensors, and/or other information. Electronic information may comprise information related to information stored by in electronic storage that conveys the light and/or electromagnetic radiation incident on an image sensor and may constitute a conversion of the real-world visual information to information suitable for electronic storage. Playback information may comprise information that may facilitate visual reproduction of the captured real-world visual information on a computing platform (e.g. on a display of computing platform 15) and/or other display device for viewing by a user, and/or other information. By way of non-limiting example, playback information may comprise a different format of the electronic information that may be readable by a playback device.

Processor 11 may be configured to provide information-processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured by machine-readable instructions 100. Executing machine-readable instructions 100 may cause processor 11 to increase blurriness of visual content. Machine-readable instructions 100 may include one or more computer program components. Machine-readable instructions 100 may include one or more of a content component 21, a field-of-view component 22, a zoom component 23, a presentation component 24, a blur component 25, a display component 26, a user interface component 27, a capture component 28, a transfer component 20, and/or other computer program components.

Content component 21 may be configured to obtain information, including but not limited to visual information. In some implementations, visual information may represent visual content. In some implementations, visual content may have been captured by one or more image sensors. In some implementations, the obtained information may include visual content that has been captured by one or more image sensors. For example, in some implementations, visual content may have been captured by one or more image sensor of camera devices 14. Obtained information may be stored on computing platform 15, e.g. on electronic storage 12. Captured visual content may have a particular field-of-view. Field-of-view may be defined horizontally, vertically, diagonally, and/or in combinations thereof. Unless the context dictates otherwise, field-of-view may refer by default to horizontal field-of-view.

In some cases, the particular field-of-view may change throughout capture of the visual content. For example, a video may be captured for a range of time. During the first part of the video, the capture field-of-view may be large, e.g. 180 degrees. During a subsequent second part of the video, the capture field-of-view may be smaller due to zooming in, e.g. 45 degrees. During a subsequent third part of the video, the capture field-of-view may be increased to 90 degrees, for example, due to zooming out partially. The captured video may be played back using the same field-of-view as was used during capture. For example, video content may be played back on the display of computing platform 15. In some implementations, the video may be played back using one or more different fields-of-view. For example, during playback, a user may decide to zoom in, zoom out, and/or pan around. In particular, if the captured video has large field-of-view, a user may modify the field-of-view during playback. In some implementations, spherical video may have a horizontal field-of-view of 360 degrees. In some implementations, spherical video may have a vertical field-of-view of at least 180 degrees. In some implementations, spherical video may have both horizontal field-of-view of 360 degrees and vertical field-of-view of at least 180 degrees.

Field-of-view component 22 may be configured to determine a field-of-view within visual content. The field-of-view used during playback may be referred to as the display field-of-view. The field-of-view used during capture may be referred to as the capture field-of-view. For example, the field-of-view within particular visual content may range from a maximum field-of-view to a minimum field-of-view. In some implementations, a maximum field-of-view may be characterized by and/or dependent on the particular image sensor or images sensors used to capture the particular visual content. For example, some cameras/lenses may be characterized by a 120-degree horizontal field-of-view and a 90-degree vertical field-of-view for capture. In some implementations, a minimum field-of-view may be characterized by and/or dependent on the particular image sensor or images sensors used to capture the particular visual content. For example, the minimum field-of-view may further be based on the capture resolution. With a sufficiently high capture resolution, the field-of-view during playback may be reduced by zooming in, preferably while maintaining acceptable image quality.

Field-of-view component 22 may be configured to determine a particular display field-of-view for presentation of visual content on a display, e.g., the display of computing platform 15. The determined display field-of-view may range between the maximum field-of-view during capture and the minimum field-of-view during capture. In some implementations, a default display field-of-view may simply match the capture field-of-view. However, during playback, the field-of-view may be modified. For example, during a particular presentation of a video, a user may instruct the presentation to zoom in, e.g., through user interface 13. For example, during a particular presentation of a video, a program, a command, or an instruction may cause the presentation to zoom out. For example, during a particular presentation of a video, system 10 may effectuate the field-of-view to move, e.g. laterally. In some implementations, the display field-of-view may be used so a display acts as a viewfinder into particular visual content, in particular wide-angled visual content. By way of non-limiting example, the display of computing platform 15 may be used as a viewfinder for spherical video content.

Zoom component 23 may be configured to receive input that defines a modification of a field-of-view. In some implementations, zoom component 23 may be configured to determine a modification of a field of view. For example, a modification may define a transition from a first field-of-view to a second field-of-view. In some implementations, a modification may occur at a specified moment during playback, or during a specified period of playback. For example, during a first period of playback, visual content may be presented using a first display field-of-view. Subsequent to the first period, the display field-of-view may be modified to a second display field-of-view. During a second period of playback subsequent to the first period, visual content may be presented using the second display field-of-view. Playback is not limited to any particular number of periods or different fields-of-view. For example, in some implementations, viewers may freely zoom in, zoom out, and/or pan around throughout payback of the visual content.

Figure 2:
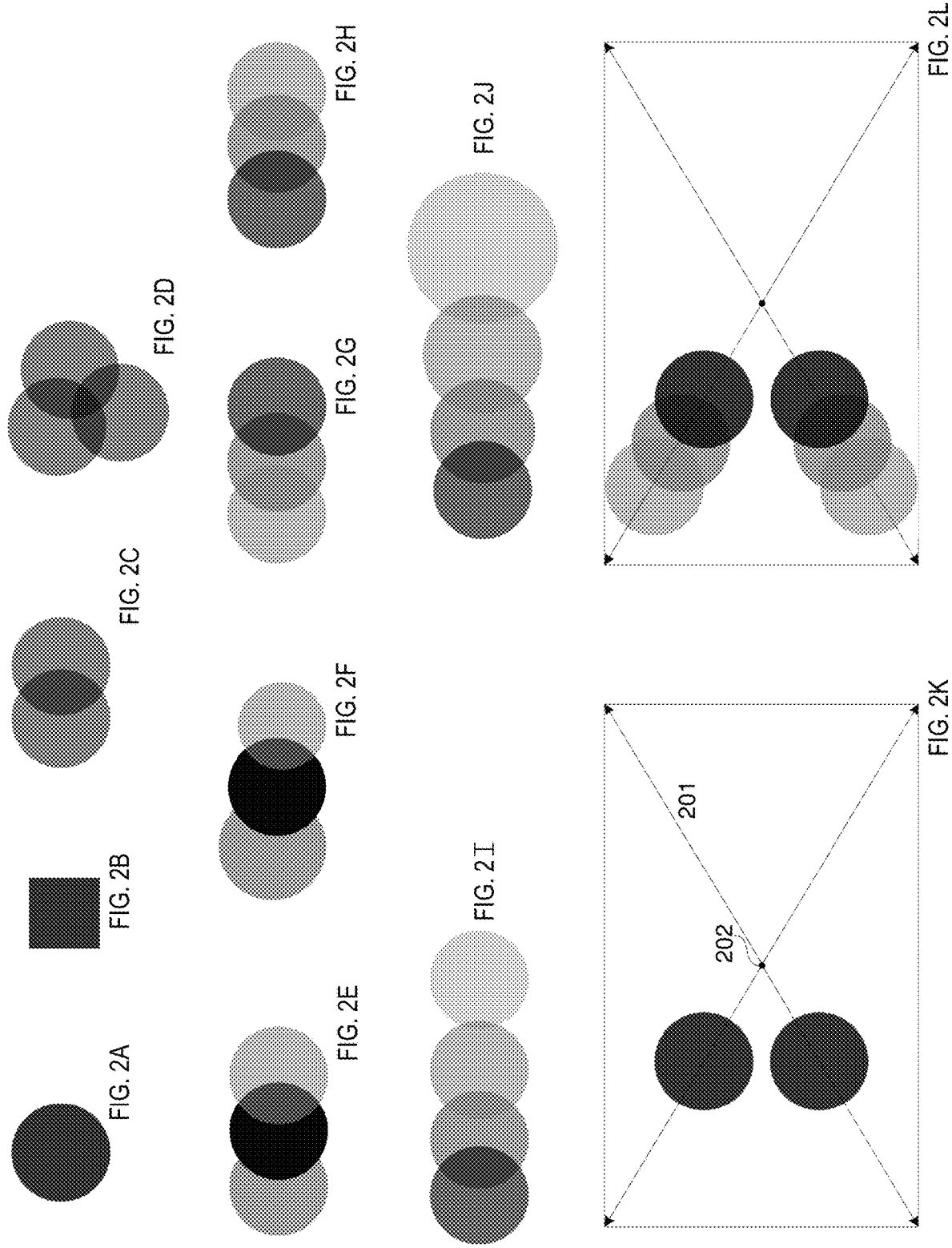
FIGS. 2A-2L illustrate examples of images and different ways to blur images, in accordance with one or more implementations.

Presentation component 24 may be configured to determine presentation information based on visual content and/or obtained visual information. The presentation information may be used to effectuate presentation on a display, e.g., on the display of computing platform 15. Presentation on the display may be referred to as playback. In some implementations, presentation information may be video content. Presentation information may have a particular field-of-view at a particular moment. For example, the field-of-view during presentation and/or playback may be determined by field-of-view component 22, zoom component 23, and/or other components of system 10. In some implementations, presentation information may include frames of visual information. In some implementations, individual frames may be ordered in a particular order. Multiple frames may be ordered chronologically. For example, a frame of visual information may represent visual content at a particular moment. In some implementations, a frame may include an array of pixels. By way of non-limiting example, FIG. 2A and FIG. 2B illustrate different representations of a single individual pixel. Pixels may have different shapes than square or circular, but for the examples in the remaining figures, a circular pixel is assumed. Presentation information may be modified, for example by blur component 25, prior to presentation.

Blur component 25 may be configured to modify presentation information prior to presentation on the display. Modification may include an increase of blurriness. In some implementations, blurriness may be defined by one or more levels of a visual characteristic of an image or other visual content. For example, visual characteristics of visual content may include, by way of non-limiting example, contrast, acutance, luminance, color, focus, sharpness, saturation, brightness, hue, defocus, and/or other characteristics. Visual characteristics of visual content may be determined based on individual pixels or groups of pixels. For example, contrast may be defined as a difference in luminance or color among multiple pixels. Multiple pixels, e.g. an array of pixels, may have a level of contrast and/or a contrast ratio as a characteristic. In some implementations, modifications by blur component 25 may be implemented by performing one or more blurring operations and/or blurring techniques on some or all of the pixels in a frame and/or image. In some implementations, modifications by blur component 25 may be implemented by repeatedly performing one or more blurring operations and/or blurring techniques on subsequent frames in a video. In some implementations, blurring may be implemented by one or more pixel-based processing and/or pixel-based transformations. For example, individual pixels may be blended and/or otherwise combined with nearby pixels. As used herein, "nearby pixels" may refer to pixels in the same frame that are in proximity, or pixels from different frames.

By way of non-limiting example, FIG. 2C illustrates an exemplary technique to blur a single pixel, by copying and transposing the copied pixel to partially overlap the original pixel. The direction of the transposition may be a characteristic of a blurring technique. In some implementations, the copied pixel may be a modified version of the original pixel, for example, by increasing the transparency of the pixel, or by adjusting the color of the pixel. As shown in FIG. 2C, both pixels are partially transparent such that the area in which the pixels overlap is darker than the other parts of the pixels. Blurring techniques are not limited to using only one copy of a pixel. For example, FIG. 2D illustrates an exemplary technique to blur a single pixel, by copying a pixel twice and transposing both copied pixels to partially overlap the original pixel. The blurring techniques shown in FIGS. 2C and 2D may be applied to some or all pixels in a frame and/or image, or to video content. In some implementations, pixels from one frame may be blended with pixels from one or more other frames.

Modifications may be limited to a certain section (such as the periphery of a particular field-of-view) and/or a certain period during playback. Modifications may be made responsive to certain events during playback. For example, a modification may be made responsive to a change in field-of-view. Blurriness may be increased through any number of a variety of image-processing techniques. For example, an image may be blurred by superimposition of a copy of itself, as illustrated in FIGS. 2C and 2D. In some implementations, copied pixels may have different colors and/or other visual characteristics. By way of non-limiting example, FIG. 2E illustrates a central black pixel that is flanked by two lighter copies, one on each side. In some implementations, copied pixels (or groups of pixels) may have different sizes and/or other visual characteristics. By way of non-limiting example, FIG. 2F illustrates a central black pixel that is flanked by two different-sized copies, a smaller copy on the right and a larger copy on the left. In some implementations, blurriness may have a direction. By way of non-limiting example, directional blur may approximate and/or mimic motion blur. By way of non-limiting example, blurriness may approximate and/or mimic optical aberration. By way of non-limiting example, FIG. 2G illustrates an original darker pixel on the right that is flanked by two lighter copies left of the original pixel. This type of blurring technique may be used to approximate and/or mimic a streaking effect commonly associated with motion blur. For example, if the darker pixel were moving to the right, a capture image of the pixel may include multiple copies of the pixel that are arranged in the direction of the moving pixel. Note that motion blur and/or other types of directional blur need not be limited to moving in a straight line, nor at a constant speed. For example, the streaking effect commonly associated with motion blur may describe an arc, a random motion, and/or other types of motions. FIG. 2H illustrates an original darker pixel on the left that is flanked by two lighter copies to the right of the original pixel. This type of blurring technique may be used to approximate and/or mimic the streaking effect as if the darker pixel were moving to the left. FIG. 2I illustrates a directional blur in the case the speed of the pixel is not constant. The oldest copy of the pixel on the left is on the far right. Since newer copies are closer to the pixel on the left, the speed of this pixel is reducing. Other changes in speed are considered within the scope of this disclosure. Any of the effects in these figures may be combined. For example, FIG. 2J illustrates a combination of the effects illustrated in FIG. 2F and FIG. 2I.

In some implementations, pixels at the center of an image or frame may be processed and/or transformed differently than pixels at the periphery of the image or frame. For example, an amount of blurriness may depend on the distance of an individual pixel to, say, the center of the field-of-view. By way of non-limiting example, FIG. 2K illustrates a frame including two black pixels. Directional arrow 201 depicts in which direction a blur effect is to be applied. In this case, directional arrow 201 originates at central point 202 and ends at a corner of the frame. Additional directional arrows originate from the same point and end at the other corners of the frame. More additional directional arrows (not depicted) fan out radially from central point 202. FIG. 2L illustrates a blurring technique applied to the frame of FIG. 2K, in accordance with directional blur according to the directional arrows. As depicted in FIG. 2L, each original pixel has two lighter copies, which are positioned along the direction of the directional arrows. For example, an amount of blurriness may depend on the distance of an individual pixel to, say, the central point in the frame. For example, a pixel directly above the central point would have copies positioned directly above the central point and further than the original pixel.

Figure 3:
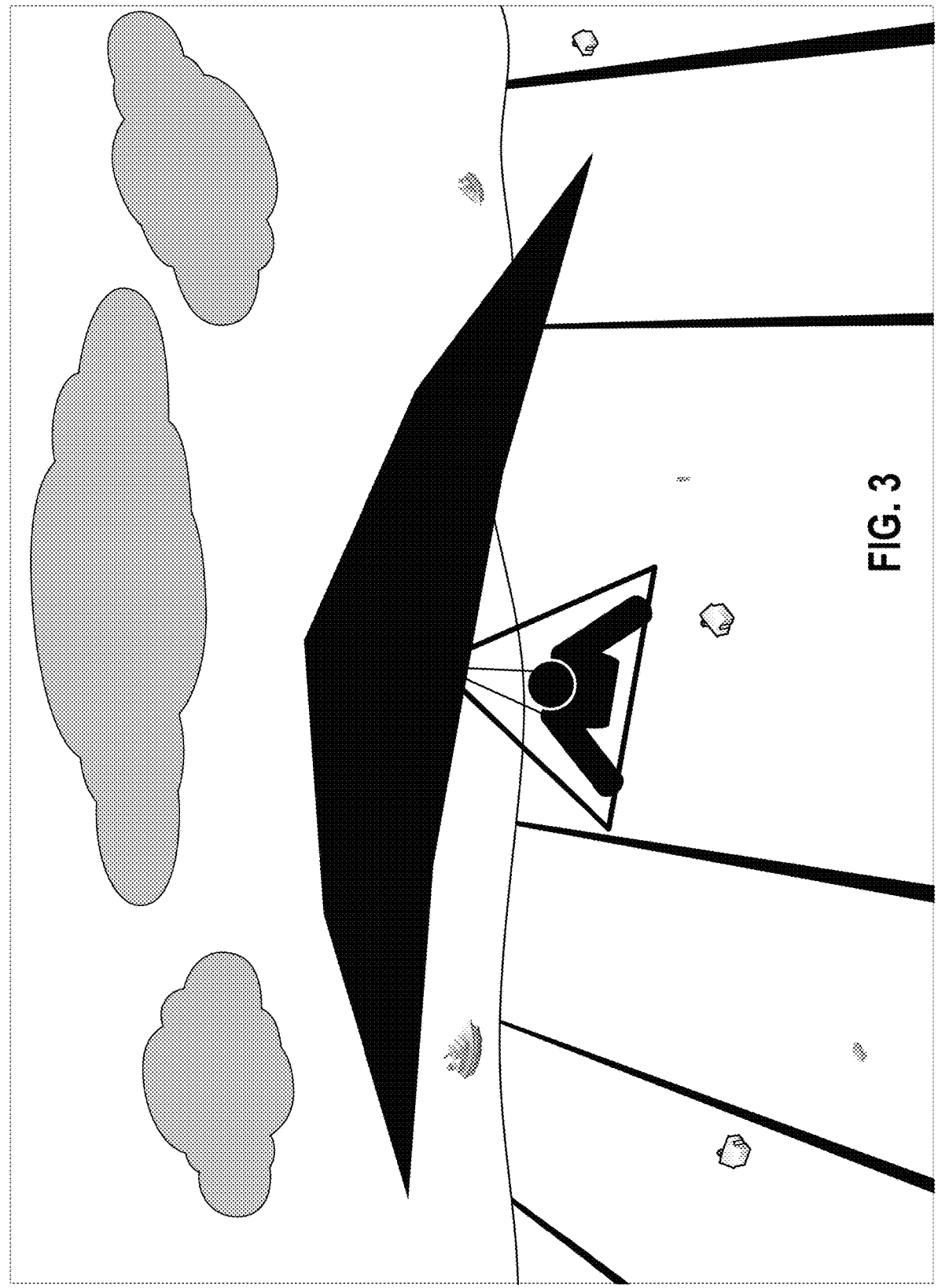
FIG. 3 illustrates an example of an image or frame that may be processed by a system to increase blurriness, in accordance with one or more implementations.

Display component 26 may be configured to effectuate presentation on a display. For example, presentations may be presented through a display and/or speaker of a computing device. For example, the display may be part of a computing platform. In some implementations, presentation of media content may include other types of visual and/or audio reproduction. For example, a particular item of media content may be projected by a (computing) device onto a screen, wall, and/or other surface. The presentation may depict visual content. In some implementations, display component 26 may be configured to present presentation information, e.g. from presentation component 24 and/or blur component 25. For example, a particular video may be presented to a user on his or her smartphone. By way of non-limiting example, FIG. 3 illustrates an example of presentation information (i.e. a frame and/or image) that may have been determined by presentation component 24, depicting a person hang-gliding high above a geographical area that includes a land area with roads, houses, and cars, and an ocean with a few ships, under a clouded sky.

Figure 4A:
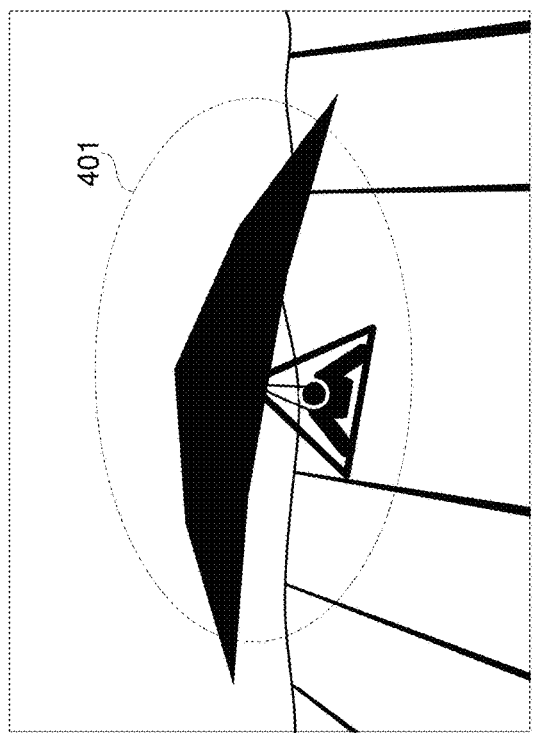
FIGS. 4A-4D illustrate examples of different steps that may be used by a system to blur an image or frame, in accordance with one or more implementations.
Figure 4B:
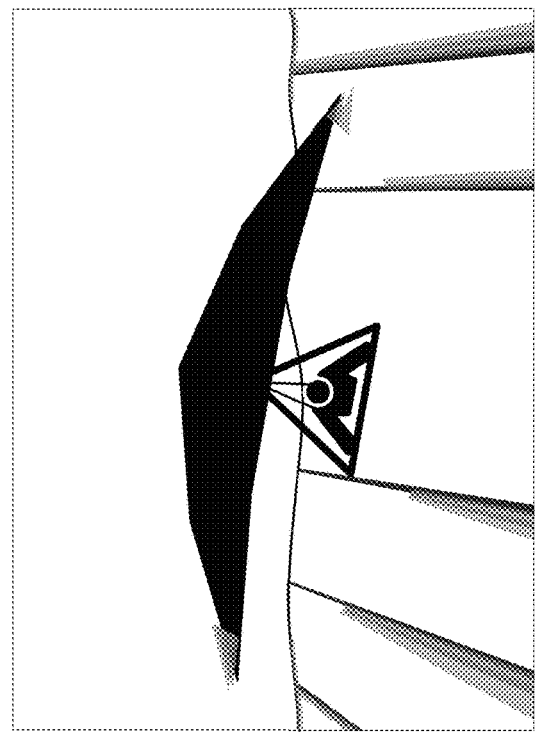
Figure 4C:
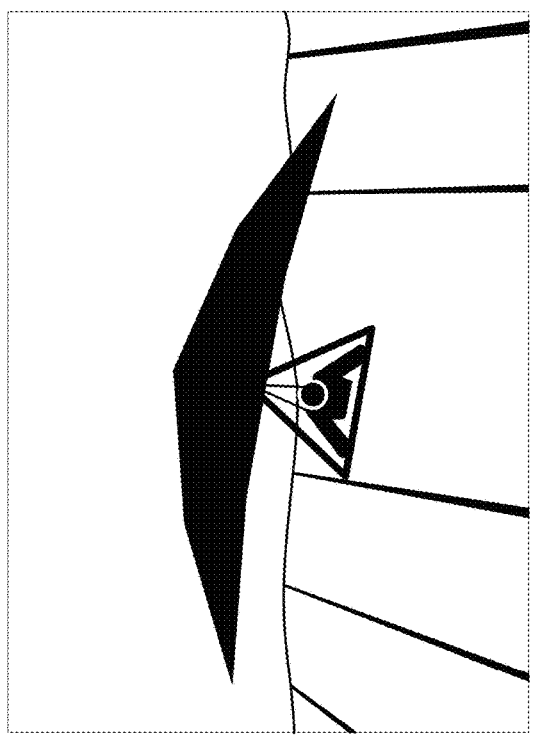
Figure 4D:
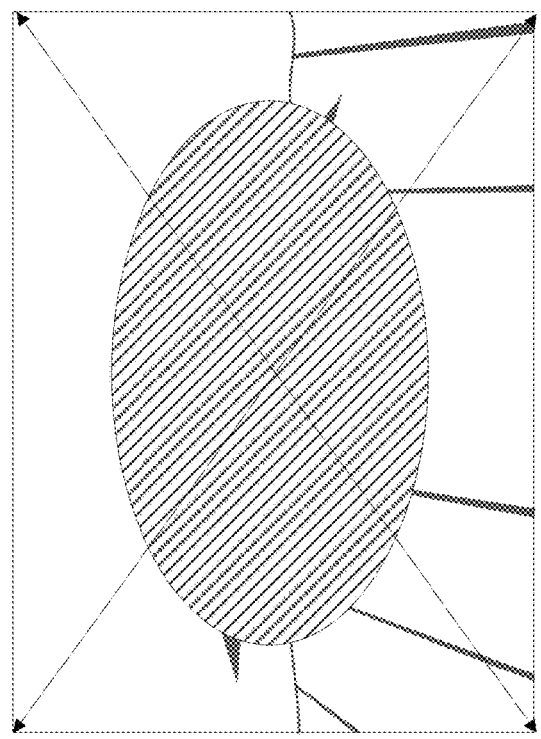

By way of non-limiting example FIGS. 4A-4D illustrates example of different steps that may be performed by system 10 to increase blurriness of a frame or image. To simplify the figures, assume that FIG. 4A represents the presentation information (i.e. a frame and/or image) that may have been determined by presentation component 24. FIG. 4B depicts an indicator 401 that defines an inside area and an outside area. The shape and location of the indicator are not intended to be limiting. For example, the inside area could be a triangle in the top left corner. In some implementations, more than two areas may be defined, e.g. with different types of blurriness applied in individual areas. As depicted in FIG. 4B, system 10 may be configured to increase blurriness in the outside area, i.e. the periphery of the frame or image. FIG. 4C depicts the outside area for which blurriness will be increased (the inside area is filled with a pattern), as well as directional arrows similar to those in FIG. 2K and FIG. 2L. More additional directional arrows (not depicted) fan out radially from the same central point. FIG. 4D depicts a particular combination of blurring effects applied to the outside area, such that two copies are made for each pixel (or visual element in the frame), and further such that the first copy is a lighter shade than the original pixel and the second copy is a lighter shade than the first copy. Furthermore, the copies are positioned in accordance with the directional arrows in FIG. 4C (in other words, the blurring effect is radial). Note that the copies are superimposed and partially transparent. Furthermore, the amount of blurriness depends on the distance of an individual pixel to the central point in the frame. For example, pixels in the corners of the frame may have larger copies than pixels near the border between the inside area and the outside area, similar to the effect illustrated in FIG. 2J. Other combinations of different blurring effects are considered within the scope of this disclosure. For example, in some implementations, the combination of blurring effects applied in one or more particular areas of an image and/or frame may include both a directional blur effect and a defocus effect. For example, in some implementations, the combination of blurring effects applied in one or more particular areas of an image and/or frame may include both a blurring effect based on the pixels in a current frame and additionally a blurring effect based on the pixels in one or more previous frames.

User interface component 27 may be configured to facilitate interaction between a user and system 10. The user interface may be configured to receive user input from the user. In some implementations, user input may be received through a touchscreen and/or other user interface device. User input may confirm, enter, and/or select options, commands, instructions, and/or other information from the user.

Capture component 28 may be configured to capture presentations presented on the display. For example, a captured presentation may be video content. In some implementations, capture component 28 may be configured to store a captured presentation, e.g. on electronic storage. In some implementations, capture component 20 may be configured to facilitate access to electronic storage. Capture component 20 may be configured to store information in electronic storage, including but not limited to digital and/or electronic information.

Transfer component 20 may be configured to facilitate transmission of information to and from the computing platform. For example, transfer component 20 may be configured to transfer visual information from a server to content component 21. For example, transfer component 20 may be configured to transfer a captured presentation to a storage server. In some implementations, transfer component 20 may control and/or include a transceiver. For example, transfer component 20 may include a wireless transceiver configured to facilitate transmission of information between the computing platform and one or more networks. By way of non-limiting example, the networks may include a cellular network, a Wi-Fi network, and/or other networks. In some implementations, a transceiver may include one or more antennae, an analog-to-digital converter, a digital-to-analog converter, encoding hardware, decoding hardware, buffers, electronic storage, a power supply, and/or other hardware components, as well as software configured to support the functionality of these hardware components. The transceiver may include fewer components or additional components not listed herein.

In some implementations, transfer component 20 may be configured to facilitate access by users to information, including but not limited to visual content. In some implementations, access by users may be implemented as access to client computing platforms that are associated with the users. For example, a first user may be associated with a first client computing platform, a second user with a second client computing platform, a third user with a third client computing platform, and so forth. Access to visual content may be implemented through one or more communicative links and/or couplings with one or more networks. For example, a particular communicative link may involve a wireless or wired connection to the internet. For example, access by a first user to a particular item of visual content may be implemented as one or more transmissions of information over one or more networks to the first client computing platform. Such transmissions may originate from one or more computing platforms (e.g. servers) that manage and/or control storage of the particular item of visual content. For example, the particular item of visual content may be electronically stored in electronic storage that is related to one or more computing platforms (e.g. servers). In some implementations, in this example, access may be implemented as the establishment of a communicative link from electronic storage via the one or more networks to the first client computing platform. In some implementations, access may be managed and/or controlled with information security in mind. For example, access may include authentication, authorization, verification, identification, combinations thereof, and/or other types of information security.

In some implementations, processor 11 may be included in one or more of a server (not shown), a computing platform (e.g. computing platform 15), a capture device (e.g. camera device 14), and/or other devices. By way of non-limiting illustration, a server may include processor 11 and may communicate with computing platforms via client/server architecture and/or other communication scheme. The server may be configured to provide features and/or functions of processor 11 to users via computing platforms. In some implementations, one or more features and/or functions of processor 11 may be attributed to individual computing platforms associated with users. By way of non-limiting illustration, individual computing platforms may obtain machine-readable instructions that are the same or similar to machine-readable instructions 100 such that features and/or functions of processor 11 may be carried out locally at the individual computing platforms. In some implementations, one or more features and/or functions of processor 11 may be attributed to individual capture devices. By way of non-limiting illustration, individual capture devices may obtain machine-readable instructions that are the same or similar to machine-readable instructions 100 such that features and/or functions of processor 11 may be carried out locally at the individual capture devices.

Computing platforms may include, by way of non-limiting example, client computing platforms, desktop computers, a laptop computers, a handheld computers, NetBooks, mobile telephones, smartphones, tablets, (smart) watches, personal medical devices, mobile computing platforms, gaming consoles, televisions, electronic devices, and/or other computing platforms. It is noted that in some implementations, system 10 may include one or more servers, one or more computing platforms, one or more capture devices, and/or other components described herein yet not explicitly shown in FIG. 1.

External resources 16 may include sources of information, hosts and/or providers of virtual environments outside of system 100, external entities participating with system 10, and/or other resources. In some implementations, some or all of the functionality attributed herein to external resources 16 may be provided by resources included in system 10.

Camera device 14 may be configured for one or both of video capture and/or image capture. Camera device 14 may include one or more sensors coupled to camera device 14, and/or other components. A sensor may be coupled to camera device 14 by virtue of being attached to camera device 14 and/or in communication with camera device 14. In some implementations, sensors coupled to camera device 14 may include one or more of an image sensor, a geolocation sensor, a motion sensor, a sound transducer, an environment sensor, a biometric sensor, and/or other sensors. Camera device 14 may include, for example, an action camera.

An image sensor may be configured to generate output signals conveying light and/or electromagnetic radiation incident on the image sensor, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

A geo-location sensor may be configured to generate output signals conveying location of a capture device, and/or other information. By way of non-limiting illustration, a geo-location sensor may comprise a GPS, and/or other sensors.

A motion sensor may be configured to generate output signals characterizing motion of a capture device over time. The motion of the capture device characterized by the output signals of the motion sensor may include one or more of speed, acceleration, rotation (e.g., pitch, roll, and/or yaw), orientation, and/or other motion. A motion sensor may include an inertial measurement unit, and/or other devices. By way of non-limiting illustration, a motion sensor may include one or more of an accelerometer, a gyroscope, a magnetometer, and/or other devices.

A sound transducer may be configured to generate output signals conveying changes in pressure indicative of sound waves incident on the sound transducer. The output signals may characterize audio content of a video. By way of non-limiting illustration, a sound transducer may include a microphone.

An environment sensor may be configured to generate output signals conveying ambient environment information. Ambient environment information may include one or more of altitude, depth, ambient light, and/or other information. By way of non-limiting illustration, an environment sensor may include one or more of an altimeter, a pressure sensor, a light sensor, and/or other sensors.

A biometric sensor may be configured to generate output signals conveying biometric information. Biometric information may include one or more of heart rate, breathing rate, blood pressure level, the current position, location, and/or direction of a user's face, eyes, and/or gaze, and/or other biometric information. By way of non-limiting illustration, a biometric sensor may include one or more of a blood pressure sensor, a pulse oximeter, a heart rate sensor, a Blood Alcohol Concentration (BAC) sensor, and/or other sensors.

Returning to FIG. 1, although processor 11 and electronic storage 12 are shown to be included in computing platform 15, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 20-28 may be eliminated, and some or all of its functionality may be provided by other computer program components. As another example, processor 11 may be configured to execute one or more additional computer program components that may perform some or all of the functionality attributed to one or more of computer program components 20-28 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may include one or more virtual storage resources (e.g., cloud storage, a virtual private network, and/or other virtual storage resources). Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 5:
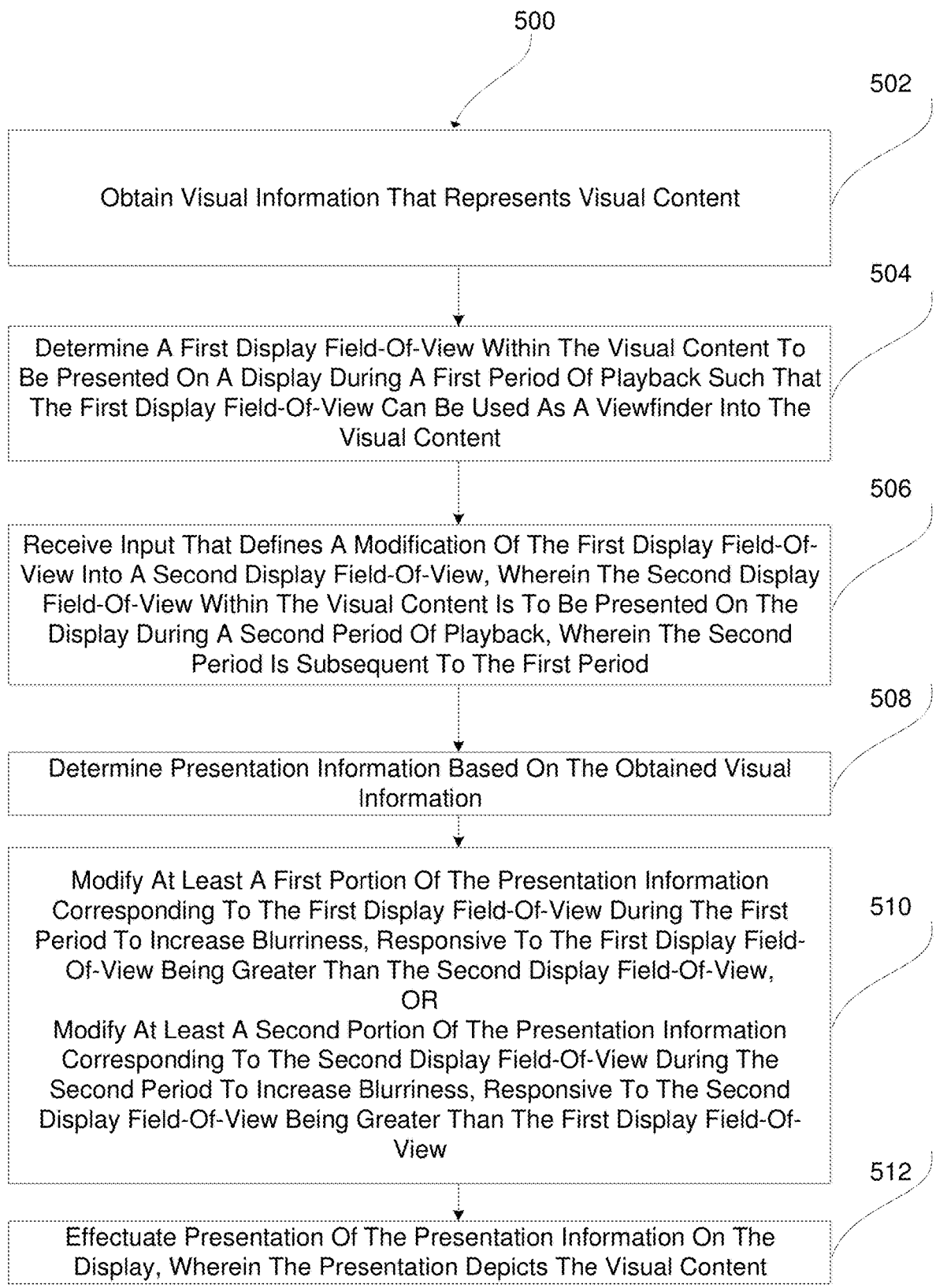
FIG. 5 illustrates a method to increase blurriness of visual content, in accordance with one or more implementations.

FIG. 5 illustrates a method 500 to increase blurriness of visual content, in accordance with one or more implementations. The operations of method 500 presented below are intended to be illustrative. In some implementations, method 500 may be accomplished with one or more additional operations not described, and/or without one or more of the operations discussed. In some implementations, two or more of the operations may occur substantially simultaneously.

In some implementations, method 500 may be implemented in a computer system comprising one or more of one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), non-transitory electronic storage storing machine-readable instructions, and/or other components. The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 500.

Referring to FIG. 5 and method 500, at an operation 502, visual information is obtained that represents visual content. The visual content has been captured in the real world by one or more image sensors. In some embodiments, operation 502 is performed by a content component the same as or similar to content component 21 (shown in FIG. 1 and described herein).

At an operation 504, a first display field-of-view within the visual content to be presented on a display during a first period of playback is determined such that the first display field-of-view can be used as a viewfinder into the visual content. In some embodiments, operation 504 is performed by a field-of-view component the same as or similar to field-of-view component 22 (shown in FIG. 1 and described herein).

At an operation 506, input is received that defines a modification of the first display field-of-view into a second display field-of-view. The second display field-of-view within the visual content is to be presented on the display during a second period of playback. The second period is subsequent to the first period. In some implementations, a method to increase blurriness may omit one or more operations, such as operation 506. In some embodiments, operation 506 is performed by a zoom component the same as or similar to zoom component 23 (shown in FIG. 1 and described herein).

At an operation 508, presentation information is determined based on the obtained visual information. The presentation information corresponds to the first period followed by the second period. In some implementations, obtained visual information may have the same field-of-view throughout multiple periods. In some embodiments, operation 508 is performed by a presentation component the same as or similar to presentation component 24 (shown in FIG. 1 and described herein).

At an operation 510, at least a first portion of the presentation information corresponding to the first display field-of-view during the first period is modified to increase blurriness, responsive to the first display field-of-view being greater than the second display field-of-view. This may be referred to as a decrease in field-of-view. At least a second portion of the presentation information corresponding to the second display field-of-view during the second period is modified to increase blurriness, responsive to the second display field-of-view being greater than the first display field-of-view. This may be referred to as an increase in field-of-view. In some embodiments, operation 510 is performed by a blur component the same as or similar to blur component 25 (shown in FIG. 1 and described herein). In some implementations, modification of the presentation information may be based on one or more characteristics of the current display field-of-view. For example, if the current display field-of-view breaches a threshold level for being sufficiently zoomed out (i.e. a large display field-of-view), a particular blurring effect may be applied automatically. Conversely, in some implementations, if the current display field-of-view breaches a different threshold level for being sufficiently zoomed in (i.e. a small display field-of-view), one or more (or all) blurring effects may be removed automatically.

At an operation 512, presentation of the presentation information is effectuated on the display. The presentation depicts the visual content. In some embodiments, operation 512 is performed by a display component the same as or similar to display component 26 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for dynamically changing blurriness of visual content, the system comprising:
   one or more physical processors configured by machine-readable instructions to:
      obtain visual information that represents visual content;
      determine a display field-of-view for playback of the visual content on a display, the display field-of-view including fields-of-view of the visual content to be presented during the playback, the display field-of-view including a change in the fields-of-view of the visual content such that the display field-of-view includes a first field-of-view of the visual content for a first period of playback and a second field-of-view of the visual content for a second period of playback subsequent to the first period of playback;
      determine presentation information based on the visual information and the change in the fields-of-view of the visual content, wherein the presentation information represents modified visual content, the modified visual content including the visual content modified based on the change in the fields-of-view of the visual content, wherein:
         (i) responsive to the first field-of-view being greater than the second field-of-view, at least a first portion of the visual content within the first field-of-view during the first period is modified in the modified visual content to increase blurriness, and
         (ii) responsive to the second field-of-view being greater than the first field-of-view, at least a second portion of the visual content within the second field-of-view during the second period is modified in the modified visual content to increase blurriness; and
      effectuate presentation of the modified visual content on the display based on the presentation information.

2. The system of claim 1, wherein increased blurriness is characterized by a reduction of one or both of acutance and contrast.

3. The system of claim 1, wherein the first portion of the visual content includes one or more peripheral sections of the visual content within the first field-of-view and the second portion of the visual content includes one or more peripheral sections of the visual content within the second field-of-view.

4. The system of claim 1, wherein increased blurriness is applied to the first portion of the visual content such that one or more levels of blurriness of the first portion of the visual content increase with increased distance from a focal point within the first field-of-field.

5. The system of claim 1, wherein increased blurriness is applied temporarily.

6. The system of claim 1, wherein increased blurriness is applied to mimic motion blur.

7. The system of claim 1, wherein the display is a two-dimensional display.

8. The system of claim 1, wherein the visual content includes wide-angled visual content.

9. The system of claim 1, wherein the change in the fields-of-view of the visual content is determined based on user input.

10. The system of claim 1, wherein the one or more physical processors are further configured to capture the presentation of the modified visual content on the display as video content.

11. A computer-implemented method to dynamically changing blurriness of visual content, the method being implemented on a computing platform that includes one or more physical processors configured by machine-readable instructions, the method comprising:

obtaining visual information that represents visual content;

determining a display field-of-view for playback of the visual content on a display, the display field-of-view acting including fields-of-view of the visual content to be presented during the playback, the display field-of-view including a change in the fields-of-view of the visual content such that the display field-of-view includes a first field-of-view of the visual content for a first period of playback and a second field-of-view of the visual content for a second period of playback subsequent to the first period of playback;

determining presentation information based on the visual information and the change in the fields-of-view of the visual content, wherein the presentation information represents modified visual content, the modified visual content including the visual content modified based on the change in the fields-of-view of the visual content, wherein:

(i) responsive to the first field-of-view being greater than the second field-of-view, modifying at least a first portion of the visual content within the first field-of-view during the first period in the modified visual content to increase blurriness, and (ii) responsive to the second field-of-view being greater than the first field-of-view, modifying at least a second portion of the visual content within the second field-of-view during the second period in the modified visual content to increase blurriness; and effectuating presentation of the modified visual content on the display based on the presentation information.

12. The method of claim 11, wherein increased blurriness is characterized by a reduction of one or both of acutance and contrast.

13. The method of claim 11, wherein the first portion of the visual content includes one or more peripheral sections of the visual content within the first field-of-view and the second portion of the visual content includes one or more peripheral sections of the visual content within the second field-of-view.

14. The method of claim 11, wherein increased blurriness is applied to the first portion of the visual content such that one or more levels of blurriness of the first portion of the visual content increase with increased distance from a focal point within the first field-of-field.

15. The method of claim 11, wherein increased blurriness is applied temporarily.

16. The method of claim 11, wherein increased blurriness is applied to mimic motion blur.

17. The method of claim 11, wherein the display is a two-dimensional display.

18. The method of claim 11, wherein the visual content includes wide-angled visual content.

19. The method of claim 11, wherein the change in the fields-of-view of the visual content is determined based on user input.

20. The method of claim 11, further comprising capturing the presentation of the modified visual content on the display as video content and storing the video content on electronic storage media.

* * * * *